(12) United States Patent
Huang et al.

(10) Patent No.: US 12,326,739 B2
(45) Date of Patent: Jun. 10, 2025

(54) HIGH-PRESSURE LABOR-SAVING PRESSURE REGULATOR

(71) Applicant: SHAKO CO., LTD., Taoyuan (TW)

(72) Inventors: Yin-Hsiang Huang, Taoyuan (TW); Pei-Shi Chu, Taoyuan (TW)

(73) Assignee: SHAKO CO., LTD., Taoyuan (TW)

( * ) Notice: Subject to any disclaimer, the term of this patent is extended or adjusted under 35 U.S.C. 154(b) by 0 days.

(21) Appl. No.: 18/433,477

(22) Filed: Feb. 6, 2024

(65) Prior Publication Data

US 2024/0402734 A1    Dec. 5, 2024

(30) Foreign Application Priority Data

May 29, 2023    (TW) .................................. 112205353

(51) Int. Cl.
    *G05D 16/10*    (2006.01)

(52) U.S. Cl.
    CPC .......... *G05D 16/109* (2019.01); *G05D 16/103* (2013.01); *Y10T 137/7797* (2015.04); *Y10T 137/7826* (2015.04)

(58) Field of Classification Search
    CPC .................................................... G05D 7/0126
    See application file for complete search history.

(56) References Cited

U.S. PATENT DOCUMENTS

| | | | | | |
|---|---|---|---|---|---|
| 3,911,947 | A * | 10/1975 | Boxall | ..................... | F16K 17/20 137/505.14 |
| 4,111,222 | A * | 9/1978 | Hassell | .............. | G05D 16/0663 137/116.5 |
| 5,515,930 | A * | 5/1996 | Glaser | ..................... | B44B 3/005 173/128 |
| 6,006,780 | A * | 12/1999 | Tseng | ................... | G05D 16/166 137/488 |
| 6,725,880 | B1 * | 4/2004 | Liu | ...................... | G05D 7/0126 137/553 |
| 2004/0003847 | A1 * | 1/2004 | Ottestad | .............. | G01M 3/3236 137/505.41 |
| 2004/0099313 | A1 * | 5/2004 | Gotthelf | ............... | G05D 16/107 137/505.39 |
| 2004/0149336 | A1 * | 8/2004 | Wiederkehr | ............ | F16K 1/306 137/505.11 |
| 2009/0283152 | A1 * | 11/2009 | Mason | ............... | G05D 16/0672 137/116.3 |
| 2015/0059878 | A1 * | 3/2015 | Kobayashi | ........... | F02M 21/023 137/505.14 |

* cited by examiner

*Primary Examiner* — Robert K Arundale

(57) ABSTRACT

A high-pressure labor-saving pressure regulator includes a main body, valve core assembly, main piston assembly, balance piston, and pressure regulating handle. The inside of the main body has a pressure reducing space, an input channel, and an output channel. The pressure reducing space includes a first subspace and a second subspace communicated by a seat port. The valve core member is used to regulate an opening of the seat port, and two ends of a poppet spring are respectively abutted against the valve core member and the main body. The main piston assembly includes a piston rod, a main piston, and a pressure regulating spring. A space between a bottom surface of the main piston and the main body, and a space between a top surface of the balance piston and the main body, allows fluid to flow into the top surface of the balance piston.

5 Claims, 3 Drawing Sheets

HIGH-PRESSURE LABOR-SAVING PRESSURE REGULATOR

CROSS-REFERENCE TO RELATED APPLICATION

This non-provisional application claims priority under 35 U.S.C. § 119(a) on Patent Application No(s).112205353 filed in Taiwan, R.O.C. on May 29, 2023, the entire contents of which are hereby incorporated by reference.

BACKGROUND OF THE INVENTION

1. Field of the Invention

The present disclosure relates to a pressure regulator, and in particular to a high-pressure labor-saving pressure regulator suitable for high-pressure applications.

2. Description of the Related Art

As shown in FIG. 1, which illustrates a conventional pressure regulator, the principle of the general pressure regulator is that a main body 6 is provided with a valve core assembly 7 and a piston assembly 8, and the piston assembly 8 divides the space in the main body 6. The high-pressure fluid (generally gas) enters the main body 6 from an input channel 61, and by twisting and pressing downward a pressure regulating handle H to push a compression spring 9 and the piston assembly 8, the valve core assembly 7 adjusts an opening of the seat port, and the pressure-reduced gas flows out of the main body 6 from an output channel 62. In the process of pressure reduction, the force that gas exerts upward pressure on the bottom surface of the piston assembly 8 and the downward force of the compression spring 9 reaches dynamic equilibrium.

However, when the greater pressure range for which the pressure regulator is applicable, the greater force that needs to be overcome to twist and press downward on the pressure regulating handle H, and certainly, it is more difficult. According to the mechanical formula: the applied force is equal to the pressure of fluid multiply the cross-sectional area ($F=P*A$). Although the force exerted upward by the gas on the bottom surface of the piston assembly 8 can be reduced by reducing the cross-section of the piston assembly 8, thereby reducing the force required to twist or press downward on the pressure regulating handle H, it will reduce the pressure regulating accuracy. In other words, the traditional pressure regulator can only choose to sacrifice one of the advantages of saving labor or pressure regulating accuracy, but cannot take into account both of the above advantages.

BRIEF SUMMARY OF THE INVENTION

Therefore, in order to solve the various problems of the traditional pressure regulator, the present invention discloses a high-pressure labor-saving pressure regulator, which takes into account the needs of saving labor and accurate pressure regulation at the same time.

To achieve the above objective and other objectives, the present disclosure provides a high-pressure labor-saving pressure regulator, including: a main body, having a pressure reducing space, an input channel, and an output channel inside. The pressure reducing space includes a first subspace and a second subspace, and the first subspace and the second subspace are communicated by a seat port. The input channel and the output channel are communicated to the outside of the main body. A valve core assembly is disposed in the first subspace. The valve core assembly includes a valve core member and a poppet spring. The valve core member is used to regulate an opening of the seat port. Two ends of the poppet spring are respectively abutted against the valve core member and the main body. A main piston assembly is disposed in the second subspace. The main piston assembly includes a piston rod, a main piston, and a pressure regulating spring. One end of the piston rod, along a moving direction, is connected with the main piston and is abutted against the valve core member. A balance piston is disposed in the second subspace. The pressure regulating spring is disposed between the main piston and the balance piston. A pressure regulating handle is disposed in the main body, and the pressure regulating handle is connected to the other end of the piston rod in the moving direction. A space between a bottom surface of the main piston and the main body is communicated with a space between a top surface of the balance piston and the main body, so as to allow a fluid to flow into the top surface of the balance piston. An effective area of the top surface of the balance piston is not greater than an effective area of the bottom surface of the main piston.

In an embodiment of the present disclosure, the effective area of the top surface of the balance piston is smaller than the effective area of the bottom surface of the main piston.

In an embodiment of the present disclosure, the main piston assembly further comprises a connecting member, the connecting member extends along the moving direction, and the main piston and the balance piston are respectively disposed at two ends of the connecting member. A communicating channel is formed between the connecting member and the piston rod, and the communicating channel communicates the space between the bottom surface of the main piston- and the main body as well as the space between the top surface of the balance piston and the main body.

In an embodiment of the present disclosure, the piston rod is disposed in the connecting member, and the two ends of the piston rod in the moving direction are respectively abutted against the main piston and the balance piston.

In an embodiment of the present disclosure, the valve core member has a regulating portion, the regulating portion is disposed at one side of the seat port, and an orifice of the regulating portion changes gradually.

In an embodiment of the present disclosure, the valve core member further has an extension section, one end of the extension section is connected to the regulating portion, and the other end of the extension section extends towards the piston rod and protrudes into the second subspace.

In an embodiment of the present disclosure, the valve core assembly further has a main valve sealing member, which is circumferentially disposed at the seat port.

Accordingly, the high-pressure labor-saving pressure regulator of the present disclosure allows the fluid flowing into the main body to assist personnel in exerting force, achieving an easy and labor-saving effect without sacrificing the pressure regulating accuracy, and can even save more than 80% of exerting force (torque).

DETAILED DESCRIPTION OF THE INVENTION

To facilitate understanding of the present disclosure, the following specific embodiments together with the attached drawings for the detailed description of the present application are provided. One skilled in the art can understand the object, characteristics and effects of this present disclosure by the content described in the specification. It should be noted that various possible modifications and alterations to the details of the specification could be carried out by implementing or applying other different embodiments based on different views and applications without departing from the spirit of the present disclosure. The related technical contents of the disclosure will be described in detail by the embodiments. However, the disclosed contents should not be considered to limit the scope of the present disclosure.

Figure 1:
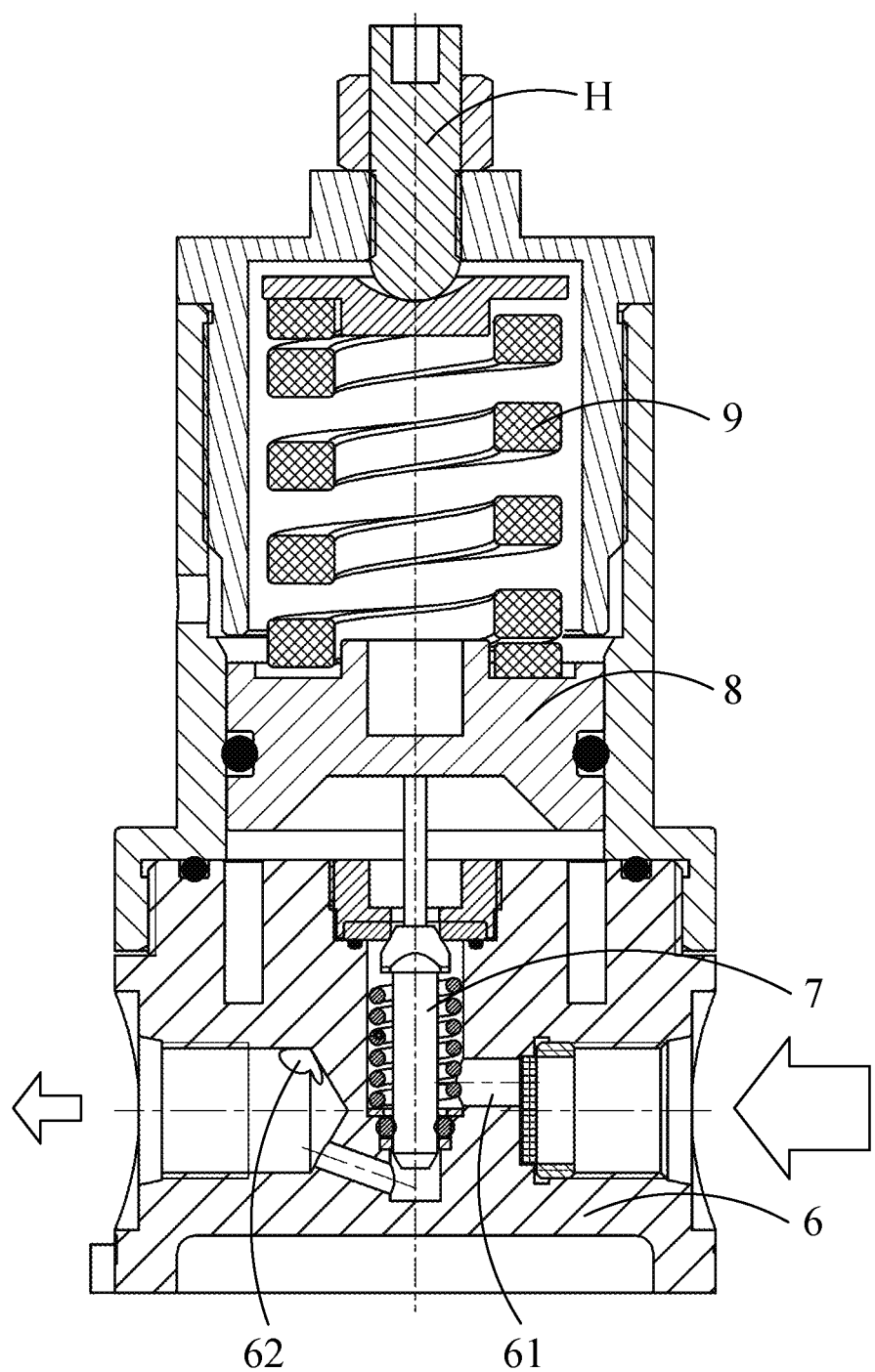
FIG. 1 is a sectional view of a pressure regulator of the prior art.
Figure 2:
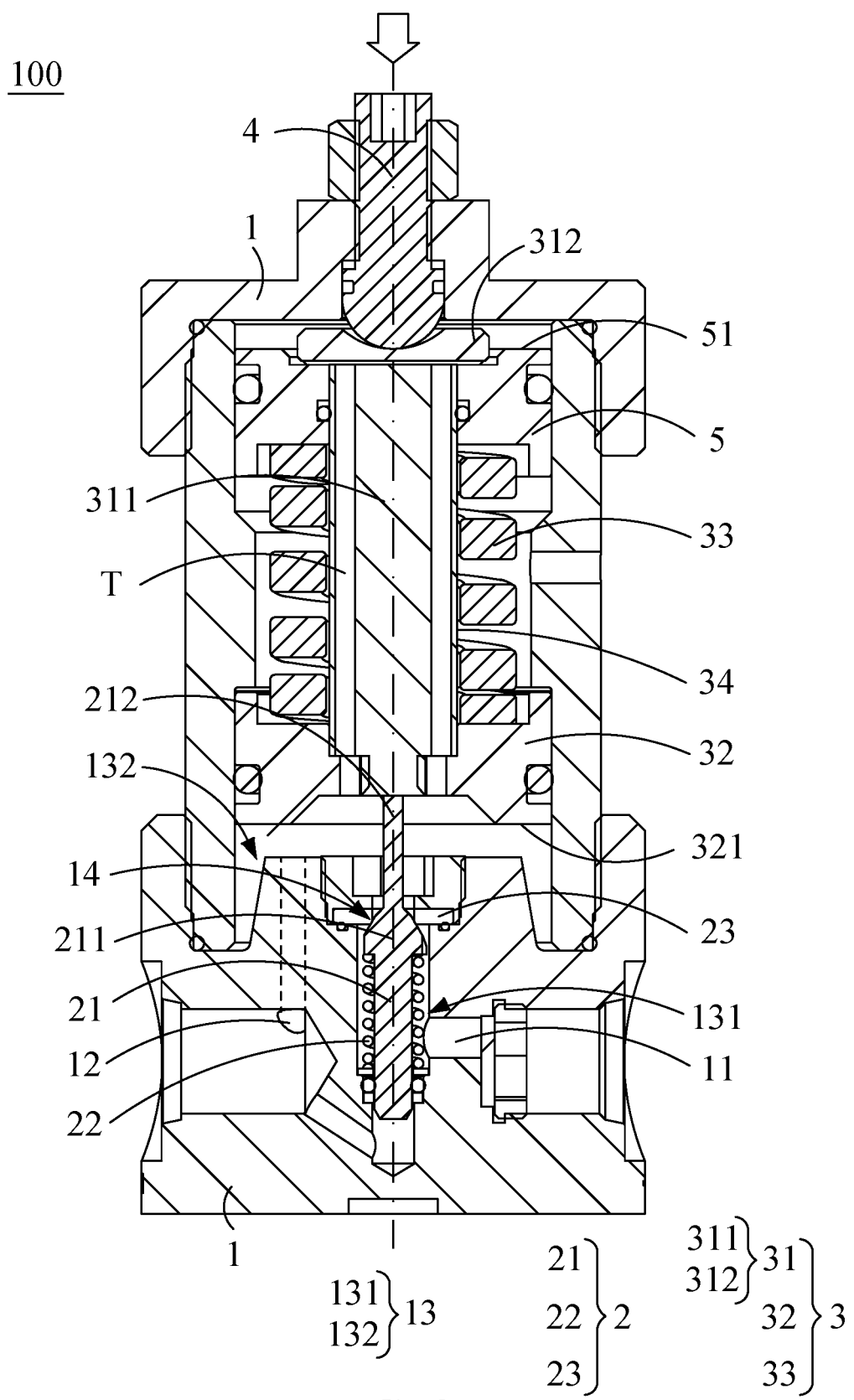
FIG. 2 is a sectional view of a high-pressure labor-saving pressure regulator according to an embodiment of the present disclosure.

As shown in FIG. 2, a high-pressure labor-saving pressure regulator 100 in an embodiment of the present disclosure includes: a main body 1, a valve core assembly 2, a main piston assembly 3, a balance piston 5, and a pressure regulating handle 4.

The inside of the main body 1 has a pressure reducing space 13, an input channel 11, and an output channel 12. The pressure reducing space 13 includes a first subspace 131 and a second subspace 132, and the first subspace 131 and the second subspace 132 are communicated by a seat port 14. The input channel 11 and the output channel 12 are communicated to the outside of the main body 1, and are respectively used for inputting a high-pressure fluid (generally a gas) into the pressure reducing space 13 and outputting the pressure-reduced fluid from the pressure reducing space 13. In detail, in an embodiment, the input channel 11 communicates the outside to the first subspace 131, and the output channel 12 communicates the second subspace 132 to the outside.

The valve core assembly 2 is disposed in the first subspace 131. The valve core assembly 2 includes a valve core member 21 and a poppet spring 22. The valve core member 21 is used to regulate an opening of the seat port 14, and two ends of the poppet spring 22 are respectively abutted against the valve core member 21 and the main body 1. Through the pressure regulating handle 4, the valve core member 21 is pressed by the balance piston 5 and the main piston assembly 3 to make the seat port 14 have different openings. When the external force is removed, the poppet spring 22 is used for returning the valve core member 21 to its original position.

The main piston assembly 3 is disposed in the second subspace 132. The main piston assembly 3 includes a piston rod 31, a main piston 32 and a pressure regulating spring 33. One end of the piston rod 31, along a moving direction (indicated by the arrow pressed downward above FIG. 2), is connected with main piston 32 and is abutted against the valve core member 21. When the piston rod 31 is exerted a force by the pressure regulating handle 4 and moves downward to push the valve core member 21, the piston rod 31 also drives the main piston 32 to move. In detail, in an embodiment, the piston rod 31 can be further divided into a rod 311 and a pressing piece 312. The rod 311 is connected with a main piston 32, and the pressing piece 312 is abutted against the balance piston 5, so that the piston rod 31 can drive the main piston 32 and the balance piston 5 when moving downward along the moving direction. However, the present disclosure is not limited thereto, the piston rod 31 and the main piston 32 can move in conjunction through other connection methods. The pressure regulating spring 33 is disposed between the main piston 32 and the balance piston 5. When the balance piston 5 is driven by the piston rod 31 and moves downward along the moving direction, the pressure regulating spring 33 is also compressed. When the external force is removed or the atmospheric pressure at the bottom of the main piston 32 is large, the pressure regulating spring 33 releases the elastic potential energy to make the balance piston 5 move in the opposite direction (upwards in the figure).

The balance piston 5 is disposed in the second subspace 132 and opposite the main piston 32. Both the balance piston 5 and the main piston 32 move glidingly in the second subspace 132 in the main body 1.

The pressure regulating handle 4 is separate into 2 parts. One is exposed to the main body 1 for personnel control. The other part is embedded in the main body 1 that is connected to the other end of the piston rod 31 in the moving direction.

Figure 3:
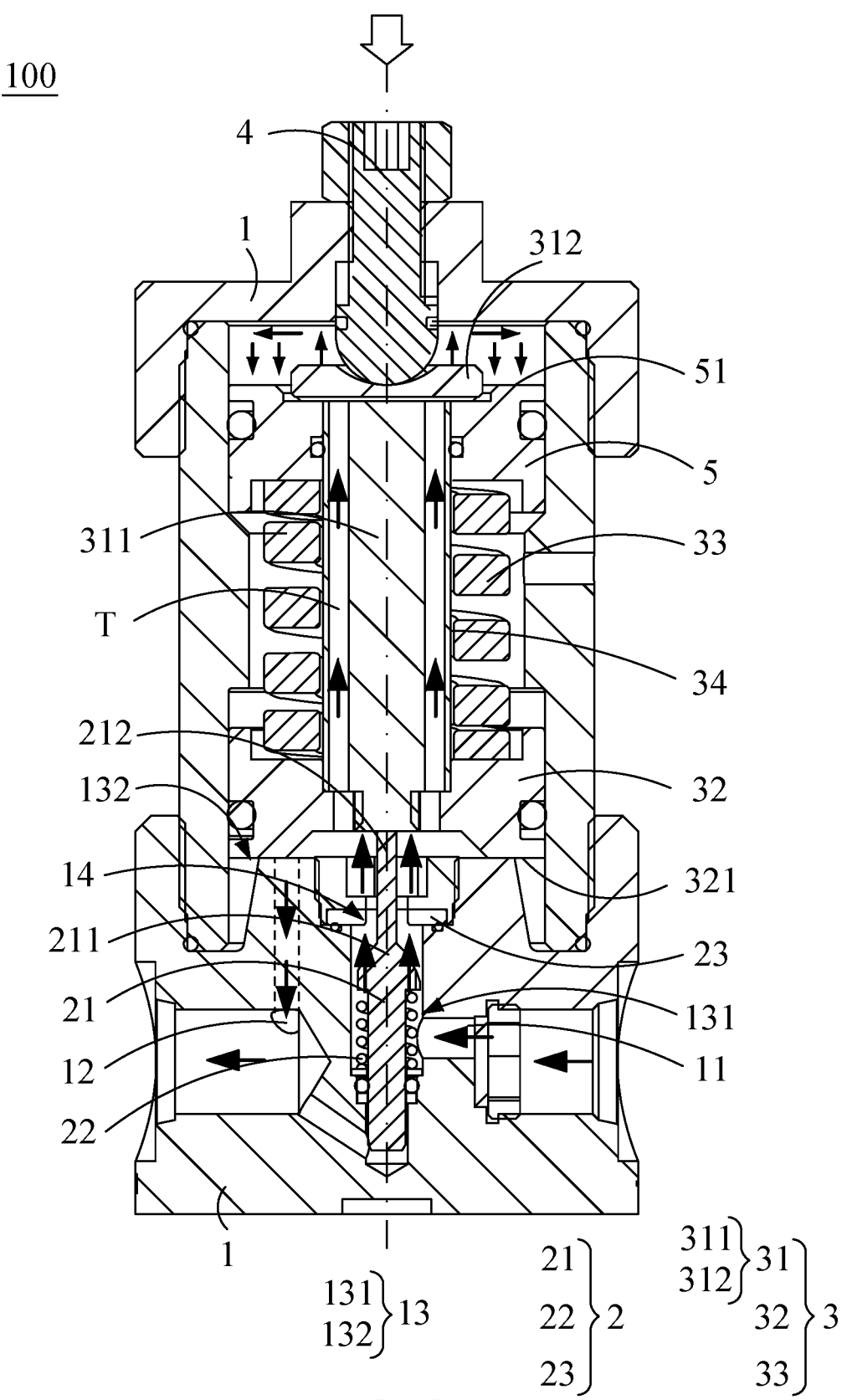
FIG. 3 is a schematic view of the dynamic equilibrium of FIG. 2.

The principle that the high-pressure labor-saving pressure regulator 100 of the present disclosure is more labor-saving than the previous technology is that a space between a bottom surface 321 of the main piston 32 and the main body 1 is communicated with a space between a top surface 51 of the balance piston 5 and the main body 1, so as to allow a fluid to flow into the top surface of the balance piston 5. The purpose of such design is that, referring to FIG. 3, after the high-pressure fluid enters the second subspace 132 through the input channel 11, the first subspace 131, and the seat port 14, it can further flow from the space between the bottom surface 321 of the main piston 32 and the main body 1 to the space between the top surface 51 of the balance piston 5 and the main body 1. The fluid flowing into the top surface 51 of the balance piston 5 and the main body 1 also has same pressure, and can offset a part of force exerted on the bottom surface 321 by the fluid between the bottom surface 321 and the main body 1. In other words, the sum of the force exerted by the personnel operating the pressure regulating handle 4 along the moving direction and the force exerted on the top surface 51 by the fluid between the top surface 51 of the balance piston 5 and the main body 1 (referring to the downward arrow of FIG. 3) overcomes the force exerted on the bottom surface 321 by the fluid between the bottom surface 321 of the main piston 32 and the main body 1 (the upward arrow of FIG. 3). As a result, the required force exerted by the personnel will be greatly reduced.

The above can be expressed as the following formula: $F_H + F_{b51} = F_S$ and $F_{b321} = F_S$ (at an equilibrium state), wherein $F_H$ represents the force exerted by operating the pressure regulating handle 4, $F_{b51}$ represents the force exerted on the top surface 51 of the balance piston 5 by the fluid, $F_S$ represents the force of the pressure regulating spring 33, and $F_{b321}$ represents the force exerted on the bottom surface 321 by the fluid. The larger $F_{b51}$ is, the smaller $F_H$ the required force exerted by operating the pressure regulating handle 4 is, and the more force could be saved.

$F_{b51}$ can be further expressed as: $F_{b51} = P_{b51} * A_{b51}$, $F_{b321}$ can be further expressed as: $F_{b321} = P_{b321} * A_{b321}$, wherein $P_{b51}$, $P_{b321}$ respectively represent the fluid pressure between the top surface 51 of the balance piston 5 and the main body 1 as well as the fluid pressure between the bottom surface 321 of the main piston 32 and the main body 1, and $A_{b51}$ and $A_{b321}$ respectively represent the effective area of the top surface 51 and the effective area of the bottom surface 321 of the main piston 32.

Because the space between the bottom surface 321 and the main body 1 as well as the space between the top surface 51 and the main body 1 are communicated, the pressure of $P_{b51}$ and $P_{b321}$ is theoretically equal. Therefore, the effective area $A_{b51}$ of the top surface 51 of the balance piston 5 requires to be not greater than the effective area $A_{b321}$ of the bottom surface 321 of the main piston 32, otherwise the pressure regulator will lose its effect. A better practice is that the effective area $A_{b51}$ of the top surface 51 of the balance piston 5 requires to be smaller than the effective area $A_{b321}$ of the bottom surface 321 of the main piston 32, so that the main piston assembly 3 and the balance piston 5 can be stably pushed.

The definition of effective area is a cross-sectional area that can be directly or indirectly pushed by a fluid, for example, the top surface 51 of the balance piston 5 is partially covered by the pressing piece 312, and the part that can be indirectly pushed by the gas is still regarded as the effective area; the inclined part is also calculated based on the projected area.

It should be noted that although the present embodiment describes the movement of elements in directions such as up, down, top surface, bottom surface, etc., these descriptions refer to the moving direction relative to the drawing. In fact, the displacement direction of each element is not limited to the upper and lower directions of gravity.

To sum up, the high-pressure labor-saving pressure regulator 100 of the present disclosure allows the fluid flowing into the main body 1 to assist personnel in exerting force, achieving an easy and labor-saving effect without sacrificing the pressure regulating accuracy, and can even save more than 80% of exerting force.

Further, in an embodiment, as shown in FIG. 2, the main piston assembly further has a connecting member 34. The connecting member 34 extends along the moving direction, the main piston 32 and the balance piston 5 are respectively disposed at two ends of the connecting member 34, a communicating channel T is formed between the connecting member 34 and the piston rod 31, and the communicating channel T communicates the space between the bottom surface 321 of the main piston 32 and the main body 1 as well as the space between the top surface 51 of the balance piston 5 and the main body 1.

In an embodiment, the piston rod 31 is disposed in the connecting member 34, and the two ends of the piston rod 31 in the moving direction are respectively abutted against the main piston 32 and the balance piston 5, in order to drive the main piston 32 and the balance piston 5 when pressed. However, the present disclosure is not limited thereto, and the shape design and connection relationship of the main piston 32 and the piston rod 31, as well as how the space between the bottom surface 321 and the main body 1 communicates with the space between the top surface 51 and the main body 1 can be changed according to different needs. For example, in some embodiments, the main piston assembly 3 may not have a connecting member 34 to form a communicating channel T, but instead a channel is set up in the valve wall of the main body 1, so that the space between the bottom surface 321 and the main body 1 as well as the space between the top surface 51 and the main body 1 are communicated.

Further, in an embodiment, the valve core member 21 has a poppet 211, the poppet 211 is disposed at one side of the seat port 14, and an orifice of the poppet 211 changes gradually. According to the degree that the valve core member 21 is pressed, the distance between the poppet 211 and the seat port 14 changes accordingly, and then the opening of the seat port 14 is regulated.

In an embodiment, the valve core member 21 further has an extension section 212, one end of the extension section 212 is connected to the poppet 211, and the other end of the extension section 212 extends towards the piston rod 31 and protrudes into the second subspace 132.

Further, in an embodiment, the valve core assembly 2 further has a main valve sealing member 23, which is circumferentially disposed at the seat port 14.

While the present invention has been described by means of the above embodiments, those skilled in the art should understand the embodiments are merely for describing the invention, and they should not be considered to limit the scope of the invention. It should be noted that all changes and substitutions which come within the meaning and range of equivalency of the embodiments are intended to be embraced in the scope of the invention. Therefore, the scope of the invention is defined by the claims.

What is claimed is:

1. A high-pressure labor-saving pressure regulator, comprising:
a main body, having a pressure reducing space, an input channel, and an output channel, wherein the pressure reducing space comprises a first subspace, a seat port and a second subspace, and the first subspace and the second subspace are communicated to each other by the seat port, the input channel and the output channel are communicated to the outside of the main body;
a valve core assembly, disposed in the first subspace, the valve core assembly comprises a valve core member and a poppet spring, the valve core member is used to regulate an opening of the seat port, and two ends of the poppet spring are respectively abutted against the valve core member and the main body;
a main piston assembly, disposed in the second subspace, the main piston assembly comprises a piston rod, a main piston, and a pressure regulating spring, one end of the piston rod along a moving direction is connected with the main piston and is abutted against the valve core member;
a balance piston, disposed in the second subspace, the pressure regulating spring is disposed between the main piston and the balance piston; and
a pressure regulating handle, disposed in the main body, the pressure regulating handle is connected to the other end of the piston rod in the moving direction,
wherein a space between a bottom surface of the main piston and the main body is communicated with a space between a top surface of the balance piston and the main body, so as to allow a fluid to flow into the top surface of the balance piston, and an effective area of the top surface of the balance piston is not greater than an effective area of the bottom surface of the main piston.

2. The high-pressure labor-saving pressure regulator according to claim 1, wherein the effective area of the top surface of the balance piston is smaller than the effective area of the bottom surface of the main piston.

3. The high-pressure labor-saving pressure regulator according to claim 1, wherein the main piston assembly further has a connecting member, the connecting member extends along the moving direction, the main piston and the balance piston are respectively disposed at two ends of the connecting member, a communicating channel is formed between the connecting member and the piston rod, and the communicating channel communicates the space between the bottom surface of the main piston and the main body as well as the space between the top surface of the balance piston and the main body.

4. The high-pressure labor-saving pressure regulator according to claim 3, wherein the piston rod is disposed in the connecting member, and the two ends of the piston rod in the moving direction are respectively abutted against the main piston and the balance piston.

5. The high-pressure labor-saving pressure regulator according to claim 1, wherein the valve core assembly further has a main valve sealing member, circumferentially disposed at the seat port.

\* \* \* \* \*